United States Patent [19]

Maretti

[11] Patent Number: 5,441,993

[45] Date of Patent: Aug. 15, 1995

[54] POLYURETHANE FOAMS

[75] Inventor: Guido Maretti, Singapore, Singapore

[73] Assignee: Imperial Chemical Industries PLC, London, England

[21] Appl. No.: 992,273

[22] Filed: Dec. 16, 1992

[30] Foreign Application Priority Data

Dec. 17, 1991 [GB] United Kingdom ............... 9126741

[51] Int. Cl.$^6$ .......................................... C08G 18/28
[52] U.S. Cl. .................................. 521/174; 521/155; 521/157; 521/170; 521/176; 521/174; 528/44; 528/60; 528/65; 528/66; 528/76; 528/77; 528/85
[58] Field of Search ............... 521/174, 155, 157, 164, 521/170, 176; 528/44, 60, 65, 66, 76, 77, 85

[56] References Cited

U.S. PATENT DOCUMENTS

| | | | |
|---|---|---|---|
| 4,143,004 | 3/1979 | Stromblad et al. | 521/174 |
| 4,863,976 | 9/1989 | Nichols et al. | 521/137 |
| 4,929,646 | 5/1990 | Nichols et al. | 521/137 |
| 5,059,633 | 10/1991 | Lutter et al. | 521/160 |
| 5,063,253 | 11/1991 | Gansen et al. | 521/159 |
| 5,134,172 | 7/1992 | Bruyninckx et al. | 521/137 |

FOREIGN PATENT DOCUMENTS

| | | |
|---|---|---|
| 380993 | 8/1990 | European Pat. Off. |
| 430408 | 6/1991 | European Pat. Off. |
| 433878 | 6/1991 | European Pat. Off. |
| 204875 | 9/1989 | Japan . |
| 204876 | 9/1989 | Japan . |
| 204877 | 9/1989 | Japan . |
| 263864 | 12/1989 | Japan . |

OTHER PUBLICATIONS

Chemical Abstracts, 108(1988) Jun., No. 24, Columbus, Oh, USA, No. 205982s, p. 64.

Primary Examiner—Samuel A. Acquah

[57] ABSTRACT

Process for preparing a flexible foam from a polyisocyanate, water as blowing agent and an isocyanate-reactive composition comprising a polyol with a low ethyleneoxide (EO) content, a polyol with a high EO content and an amine chain extender/cross-linker.

9 Claims, No Drawings

POLYURETHANE FOAMS

The manufacture of polyurethane flexible foams by reacting organic polyisocyanates such as tolylene diisocyanate (TDI) or diphenylmethane diisocyanate (MDI) with polyether polyols in conjunction with a foaming agent is well established. The polyethers are usually polyoxypropylene polyols derived from propylene oxide or poly(oxypropylene-oxyethylene) polyols derived from various combinations of propylene and ethylene oxides. Ethylene oxide tipped polyoxypropylene polyols wherein the oxyethylene groups constitute a minor proportion of the total oxyalkylene residues are particularly important because of their enhanced reactivity towards isocyanates. Polyols having higher oxyethylene contents, for example 50% or more on a weight basis, are often employed as minor additives to ensure that the foams have an open-cell structure.

It has now been found that flexible foam having valuable properties can be prepared from diphenylmethane diisocyanate and polyol compositions containing certain proportions of oxyethylene-containing polyols and chain extenders and/or cross-linking agents. In particular, it has been found that formulations in accordance with the invention are remarkably tolerant to changes in isocyanate index and that the foams obtained are characterised by an open cell structure without the need for crushing, high resilience levels, high comfort indices, and an excellent combination of density/hardness and compression set properties.

Accordingly, the invention provides a method for the preparation of flexible polyurethane foams from a reaction mixture comprising a polyisocyanate component, a polyol composition and water as foaming agent wherein the polyisocyanate component comprises a diphenylmethane diisocyanate composition having an average isocyanate functionality of from 2 to 2.4 and the polyol composition comprises:

(1) a first polyol component comprising at least one polyoxyalkylene polyol containing oxyethylene residues, said component having an average nominal hydroxyl functionality of at least 3, preferably 3–4, an average hydroxyl equivalent weight of at least 1500, an average oxyethylene content of from 10 to 20% by weight and an average primary hydroxyl group content greater than 50%;

(2) a second polyol component comprising at least one polyoxyalkylene polyol containing oxyethylene residues, said component having an average nominal hydroxyl functionality of at least 2, preferably 2–4, more preferably 3–4, an average hydroxyl equivalent weight of at least 1000 and an average oxyethylene content of from 50 to 85% by weight, and (3) a chain extender and/or cross-linker comprising at least one compound having at least two isocyanate-reactive groups, at least one of which is a primary or secondary amino group and a molecular weight below 500, said composition containing from 4 to 20 parts by weight of (2) and (3) together per 100 parts by weight of (1), the weight ratio of (2) to (3) being in the range from 1:1 to 20:1.

Diphenylmethane diisocyanate compositions which may be used in the method of the invention include "pure" MDI preferably containing at least 60% by weight of the 4,4'-isomer. Suitable polyisocyanates therefore include the substantially pure 4,4'-isomer and isomer mixtures containing not more than 40%, preferably not more than 30%, and more preferably not more than 20%, by weight of the 2,4'-isomer and not more than 5% by weight of the 2,2'-isomer. Other suitable diphenylmethane diisocyanate compositions include MDI variants having average isocyanate functionalities of from 2 to 2.4 derived from the aforementioned diphenylmethane diisocyanates. Such MDI variants are well known in the are and include liquid products obtained by the introduction of urethane, allophanate, urea, biuret, carbodiimide, uretonimine and/or isocyanurate residues.

Each of the polyol components present in the polyol composition may comprise a single polyoxyalkylene polyol, preferably a poly-(oxyethylene-oxypropylene) polyol, having the required functionality, equivalent weight and oxyethylene content. Such polyols are known in the art and may be obtained in conventional manner by reacting ethylene and propylene oxides with an initiator such as a polyol, a hydroxyamine, a polyamine and the like having the required amount of active hydrogen atoms.

Alternatively, each of the polyol components may comprise a mixture of two or more polyoxyalkylene polyols, preferably poly-(oxyethylene-oxypropylene) polyols, such that the total composition has the required average functionality, equivalent weight and oxyethylene content(and primary hydroxyl content in the case of the first polyol component).

The term "average nominal hydroxyl functionality" is used herein to indicate the average functionality (number of hydroxyl groups per molecule) of the polyol composition on the assumption that the average functionality (number of active hydrogen atoms per molecule) of the initiator(s) used in their preparation and of the final polyol are identical although in practice that of the polyol will often be somewhat less because of some terminal unsaturation. It is preferred that the average nominal hydroxyl functionality of each of the polyol components is from 3 to 4, the most preferred polyoxyalkylene polyols being triols.

The first polyol component preferably has an average hydroxyl equivalent weight of from 1500 to 3000 and the second polyol component preferably has an average hydroxyl equivalent weight of from 1000 to 3000.

If desired, one or more of the polyoxyalkylene polyols present in the polyol composition may contain dispersed polymer particles. Such polymer-modified polyols have been fully described in the prior art and include products obtained by the in situ polymerisation of one or more vinyl monomers, for example acrylonitrile and styrene, in polyoxyalkylene polyols or by the in situ reaction between a polyisocyanate and an amino- or hydroxy-functional compound, for example triethanolamine, in polyoxyalkylene polyols.

Chain extenders which may be used in the method of the invention include diamines containing primary and/or secondary amino groups, for example diethyl toluene diamines such as DETDA and N,N'-di-t-butyl diaminodiphenylmethane. Suitable cross-linking agents include triamines and hydroxyamines such as diethanolamine.

The amount of water used as foaming agent, preferably in the absence of other blowing agents, may be varied in known manner in order to achieve the desired foam density. Suitable amounts of water are generally at least 3.5 parts, preferably from 4 to 8 parts, by weight per 100 parts of first polyol component. The isocyanate index of the reaction system, taking account of the polyol composition, chain extenders or cross-linking agents and water may be as low as 10 or as high as 120.

The foam-forming reaction mixture may contain one or more of the additives conventional to such reaction mixtures. Such additives include catalysts, for example tertiary amines and tin compounds, surface-active agents and foam stabilisers, for example siloxane-oxyalkylene copolymers, flame retardants, organic and inorganic fillers, pigments, agents to suppress the so-called boiling-foam effect like poly-dimethylsiloxanes and internal mould release agents.

Accordingly, in a further aspect, the invention provides for a reaction system comprising:
(A) a diphenylmethane diisocyanate composition having an average isocyanate functionality of from 2 to 2.4;
(B) a polyol composition comprising:
(1) a first polyol component comprising at least one polyoyakylene polyol containing oxyethylene residues, said component having an average nominal hydroxyl functionality of at least 3, an average hydroxyl equivalent weight of at least 1500, an average oxyethylene content of from 10 to 20% by weight and an average primary hydroxyl group content greater than 50%;
(2) a second polyol component comprising at least one poly-oxyalkylene polyol containing oxyethylene residues, said component having an average nominal hydroxyl functionality of at least 2, preferably at least 3, an average hydroxyl equivalent weight of at least 1000 and an average oxyethylene content of from 50 to 85% by weight, and
(3) a chain extender and/or cross-linker comprising at least one compound having at least two isocyanate-reactive groups, at least one of which is a primary or secondary amino group and a molecular weight below 500, said composition containing from 4 to 20 parts by weight of (2) and (3) together per 100 parts by weight of (1), the weight ratio of (2) to (3) being in the range from 1:1 to 20:1.
(C) water as foaming agent and, optionally,
(D) one or more additives conventional to foam formulations.

This reaction system preferably is used in order to prepare flexible foams. The term "reaction system" is defined as a combination of components wherein the polyisocyanate composition is kept in a container separate from the isocyanate-reactive ingredients of the system.

In operating the method of the invention, a one-shot or semi-prepolymer technique may be used together with conventional mixing equipment and the foams may be produced in the form of slabstock, mouldings and the like. For use in a semi-prepolymer process, a prepolymer may be prepared in known manner by first reacting all or part of the diphenylmethane diisocyanate composition with part of the polyol composition; any of the isocyanate-reactive ingredients of the polyol composition may be used or mixtures of such isocyanate-reactive ingredients.

The invention further provides for a polyol composition comprising:
(1) a first polyol component comprising at least one polyoxyalkylene polyol containing oxyethylene residues, said component having an average nominal hydroxyl functionality of at least 3, an average hydroxyl equivalent weight of at least 1500, an average oxyethylene content of from 10 to 20% by weight and an average primary hydroxyl group content greater than 50%;
(2) a second polyol component comprising at least one polyoxyalkylene polyol containing oxyethylene residues, said component having an average nominal hydroxyl functionality of at least 2, preferably at least 3, an average hydroxyl equivalent weight of at least 1000 and an average oxyethylene content of from 50 to 85% by weight, and
(3) a chain extender and/or cross-linker comprising at least one compound having at least two isocyanate-reactive groups, at least one of which is a primary or secondary amino group and a molecular weight below 500, said composition containing from 4 to 20 parts by weight of (2) and (3) together per 100 parts by weight of (1), the weight ratio of (2) to (3) being in the range from 1:1 to 20:1. This polyol composition is preferably used in methods and reaction systems for preparing flexible foams.

The invention is illustrated but not limited by the following Examples.

EXAMPLE 1

A flexible foam was made in a mould by reacting at an index of 70 Suprasec VM 27 polyisocyanate, commercially obtainable from Imperial Chemical Industries PLC (Suprasec is a trade mark of ICI PLC), with a polyol composition comprising 50 parts by weight (pbw) of Daltocel F 2805 polyol, a polyoxypropylene triol of $OH_v$ 28 having 15% w EO-tip and a primary OH content of more than 75% w which is commercially obtainable from ICI PLC (Daltocel being a trademark of ICI PLC); 50 pbw of FA 702 a polyoxypropyleneoxyethylene polyol from pentaerythritol of $OH_v$ of 38 mg KOH/g, an EO content of 11.2% by weight and a primary OH content of 70.3% obtainable from Sanyo Kasei; 0.4 pbw of Dabco 33 LV, a tertiary amine catalyst obtainable from Air Products; 0.3 pbw of dimethylaminopropylamine; 0.4 pbw of SF2962, a silicon surfactant from Toray-silicone; 5.5 pbw of water; 0.5 of diethyltoluene diamine; 8.5 pbw of Arcol 2580, a polyoxypropyleneoxyethylene triol of $OH_v$ of 42 and containing about 75% w randomly distributed EO obtainable from Arco and 2.7 pbw of Unilink 4200 which is N,N'-di-t-butyl diaminodiphenylmethane obtainable from UOP. The density of the foam obtained was 43.9 kg/m$^3$ and the ball rebound (%) was 58 (//) and 52 (l).

EXAMPLE 2

Example 1 was repeated with the provision that the amount of high EO polyol was 4.8 pbw instead of 8.5 pbw and that the polyisocyanate used was PBA 2189 commercially obtainable from ICI PLC.

The reaction was conducted at an index of 70, 75 and 80 respectively. The foams obtained had a density of 44.0, 43.9 and 43.7 kg/m$^3$ respectively. The ball rebound was (%,//) 62, 61 and 59 respectively.

I claim:

1. A method for the preparation of flexible polyurethane foams from a reaction mixture comprising a polyisocyanate component, a polyol composition and water as foaming agent wherein the polyisocyanate component comprises a diphenylmethane diisocyanate composition having an average isocyanate functionality of from 2 to 2.4 and the polyol composition comprises:
(1) a first polyol component comprising at least one polyoxyalkylene polyol containing oxyethylene residues, said component having an average nominal hydroxyl functionality of at least 3, an average hydroxyl equivalent weight of at least 1500, an average oxyethylene content of from 10 to 20% by weight and an average primary hydroxyl group content greater than 50%;

(2) a second polyol component comprising at least one polyoxyalkylene polyol containing oxyethylene residues, said component having an average nominal hydroxyl functionality of 3, an average hydroxyl equivalent weight of at least 1000 and an average oxyethylene content of from 50 to 85% by weight, and (3) a chain extender and/or cross-linker comprising at least one compound having at least two isocyanate-reactive groups, at least one of which is a primary or secondary amino group and a molecular weight below 500, said composition containing from 4 to 20 parts by weight of (2) and (3) together per 100 parts by weight of (1), the weight ratio of (2) to (3) being in the range from 1:1 to 20:1.

2. A method according to claim 1 wherein the first polyol component has an average nominal hydroxyl functionality of 3–4.

3. A reaction system comprising:
(A) a diphenylmethane diisocyanate composition having an average isocyanate functionality of from 2 to 2.4;
(B) a polyol composition comprising:
(1) a first polyol component comprising at least one polyoxyalkylene polyol containing oxyethylene residues, said component having an average nominal hydroxyl functionality of at least 3, an average hydroxyl equivalent weight of at least 1500, an average oxyethylene content of from 10 to 20% by weight and an average primary hydroxyl group content greater than 50%;
(2) a second polyol component comprising at least one polyoxyalkylene polyol containing oxyethylene residues, said component having an average hydroxyl functionality of 3, an average hydroxyl equivalent weight of at least 1000 and an average oxyethylene content of from 50 to 85% by weight, and
(3) a chain extender and/or cross-linker comprising at least one compound having at least two isocyanate reactive groups, at least one of which is a primary or secondary amino group and a molecular weight below 500, said composition containing from 4 to 20 parts by weight of (2) and (3) together per 100 parts by weight of (1), the weight ratio of (2) to (3) being in the range from 1:1 to 20:1

(C) water as foaming agent and, optionally,
(D) one or more additives conventional to foam formulations.

4. Reaction system according to claim 3 wherein the first polyol component has an average nominal hydroxyl functionality of 3–4.

5. A polyol composition comprising:
(1) a first polyol component comprising at least one polyoxyalkylene polyol containing oxyethylene residues, said component having an average nominal hydroxyl functionality of at least 3, an average hydroxyl equivalent weight of at least 1500, an average oxyethylene content of from 10 to 20% by weight and an average primary hydroxyl group content greater than 50%;
(2) a second polyol component comprising at least one polyoxyalkylene polyol containing oxyethylene residues, said component having an average nominal hydroxyl functionality of 3, an average hydroxyl equivalent weight of at least 1000 and an average oxyethylene content of from 50 to 85% by weight, and
(3) a chain extender and/or cross-linker containing at least one compound having at least two isocyanate-reactive groups, at least one of which is a primary or secondary amino group and a molecular weight below 500, said composition containing from 4 to 20 parts by weight of (2) and (3) together per 100 parts by weight of (1), the weight ratio of (2) to (3) being in the range from 1:1 to 20:1.

6. Polyol composition according to claim 5 wherein the first polyol component as an average nominal hydroxyl functionality of 3–4.

7. A method according to claim 2 wherein each polyol component present in the polyol composition has an average nominal hydroxyl functionality of from 3 to 4.

8. A reaction system according to claim 4 wherein each polyol component present in the polyol composition has an average nominal hydroxyl functionality of from 3 to 4.

9. A polyol composition according to claim 6 wherein each polyol component in the polyol composition has an average nominal hydroxyl functionality of from 3 to 4.

* * * * *